Sept. 10, 1957    B. I. ROUTH    2,805,872
LINED PIPE COUPLING WITH INTERNALLY FLUSH GASKET
Filed Dec. 3, 1954

INVENTOR.
B. I. Routh
BY
ATTORNEY

United States Patent Office 2,805,872
Patented Sept. 10, 1957

2,805,872

LINED PIPE COUPLING WITH INTERNALLY FLUSH GASKET

Benjamin I. Routh, Great Bend, Kans., assignor to Rice Engineering and Operating, Inc., Great Bend, Kans., a corporation of Kansas Application December 3, 1954, Serial No. 472,891

1 Claim. (Cl. 285—55)

This invention relates to improvements in sealing gaskets and more particularly, but not by way of limitation, to improvements in sealing gaskets utilized between sections of cement lined pipe, or the like.

Cement lined pipe, or the like, is normally adapted to conduct corrosive fluids therethrough. A pipe collar is normally utilized between sections of the pipe in order to couple the sections together in an end to end relation. It will be apparent that a sealing gasket is necessary to effect an efficient sealing at the joint to prevent leakage, as well as to protect the pipe collar from corrosion due to the action of the fluid flowing therethrough. Presently available gaskets have many disadvantages in that they often require special tools for disposition at the pipe joint, and require the application of special sealing compounds to effect an efficient seal. The compression of the joined pipe ends against the sealing gasket will often cause it to extrude inwardly thereby forming an obstruction at the joint about which solid matter contained within the fluid will accumulate. It is apparent that this is a serious disadvantage in that the flow through the line will become restricted as the accumulation increases. Further, a vacuum within the pipe caused by the high velocity of fluid flowing therethrough will often collapse the gasket member, thereby causing an inefficient sealing at the joint.

The present invention contemplates a re-inforced sealing gasket adapted to withstand the collapsing force of low pressure within a pipe. The construction of the improved sealing gasket permits the inside diameter of the compressed gasket to assume substantially the same diameter as the inside of the cement lined pipe with which it is utilized, and substantially eliminates any inward extrusion of the gasket, thereby providing an unrestricted, efficiently sealed pipe joint. Since this compression feature maintains the inside diameter of the pipe through the pipe collar or pipe joint, there is no recess at the pipe joint. Thus, turbulence and erosion often caused by a recess at the pipe collar is also eliminated. The design of the novel gasket also facilitates the ease of insertion within the pipe collar without the use of special tools, and assures an efficient sealing at the pipe joint without the use of special sealing compounds.

It is, therefore, an important object of this invention to provide an improved sealing gasket for utilization with a pipe collar and cement lined pipe, wherein the inside diameter of the gasket under compression will assume substantially the same dimension as the internal diameter of the cement lined pipe in order to permit the unrestricted flow of fluid through the coupled pipe, and restrict turbulence and erosion at the pipe joint.

It is another object of this invention to provide a novel sealing gasket for utilization with a pipe collar and cement lined pipe, or the like, which is re-inforced to preclude the collapsing thereof under conditions of low pressure or vacuum within the coupled pipe.

It is still another object of this invention to provide a novel sealing gasket for utilization with a pipe coupling and cement lined pipe which requires no special sealing compounds to insure an efficient sealing at the pipe joint and which, therefore, will permit the use of the usual thread lubricants on the pipe threads, and will in no way bind or gall the threads, thus permitting the normal breaking of the joint after it has been in service.

It is a further object of this invention to provide a novel sealing gasket for utilization with pipe collars and cement lined pipe which requires no special tools for insertion thereof within the pipe collar, thereby facilitating the ease of utilization thereof.

It is a still further object of this invention to provide a novel sealing gasket which is of simple and economical construction.

Other objects and advantages of the invention will be evident from the following detailed description, read in conjunction with the accompanying drawings, which illustrate my invention.

Figure 1:
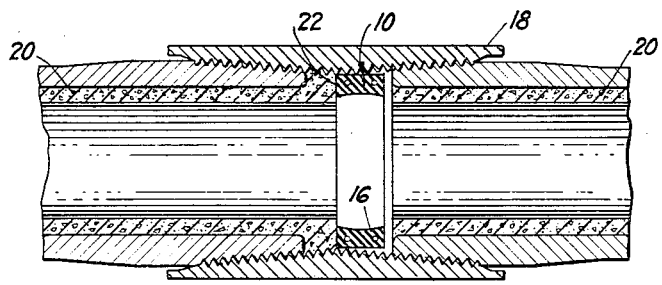
Figure 1 is a longitudinal sectional view depicting the novel sealing gasket disposed between two sections of cement lined pipe, said sealing gasket in an uncompressed condition.

Referring to the drawings in detail, reference character 10 generally refers to a novel re-inforced sealing gasket of substantially circular configuration. The gasket 10 comprises a plurality of metallic re-inforcing rings 12, usually two but not limited thereto, surrounded by a resilient portion 14, preferably of rubber material or the like. The inside diameter of the gasket 10 is provided with a concave surface 16 which is of a pre-determined size for a purpose as will be hereinafter set forth. The gasket 10 is adapted to be utilized within a standard pipe collar, or coupling 18 to seal the joint formed between two sections of cement lined pipe 20, when the sections are coupled in an end to end relationship as clearly shown in Figs. 1 and 2.

Operation

Figure 2:
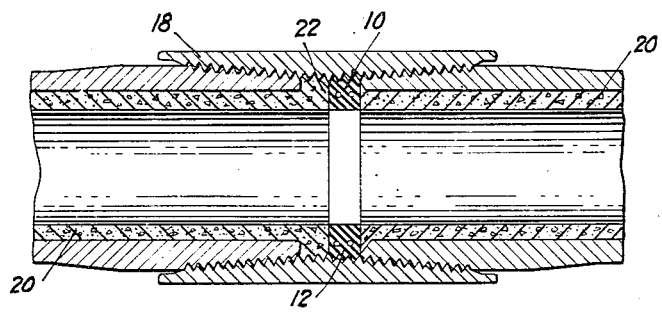
Figure 2 is a view similar to Fig. 1 depicting the sealing gasket in a compressed condition.
Figure 3:
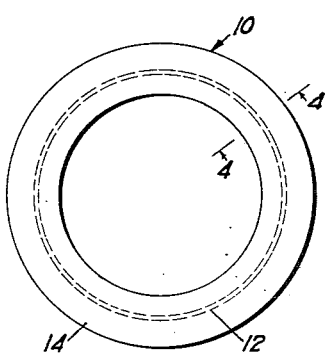
Figure 3 is a plan view of the novel sealing gasket of this invention.
Figure 4:
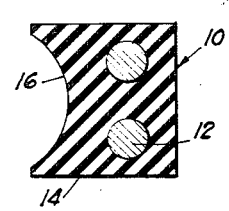
Figure 4 is a sectional view taken on line 4—4 of Fig. 3 and depicting the gasket in an uncompressed condition.
Figure 5:
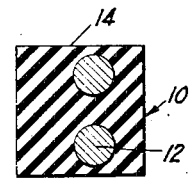
Figure 5 is a view similar to Fig. 4 depicting the sealing gasket in a compressed condition.

A pipe joint is made between two sections of pipe 20 by utilization of the pipe coupling 18 in any well-known manner. The gasket 10 may be easily disposed within the coupling 18 prior to making up the pipe by simply dropping the gasket therein. The pipe is usually hand tightened to a position as shown in Fig. 1. It will be noted that the gasket is in an uncompressed condition. The joint may now be completely made up or tightened by suitable means well known in the art, to a position as shown in Fig. 2. It will be apparent that the resilient gasket 10 will be squeezed between the adjacent ends of the pipe 20 to a compressed condition. The concave surface 16 of the gasket 10 has been constructed of a pre-determined size so that the volume of the concavity approaches the volume by which the gasket will compress. Thus, as the gasket 10 is compressed the inner periphery thereof tends to become flush with the internal diameter of the pipe 20, and the outer periphery will assume the contour of the internal threads 22 of the coupling 18 to assure an efficient sealing therearound. The re-inforcing rings 12 are provided to resist any collapsing of the gasket due to a low pressure or vacuum which may exist in the pipe.

From the foregoing, it will be apparent that the novel sealing gasket 10 provides a positive corrosion protection for the pipe collar 18 by assuring an efficient seal therearound when the pipe joint is fully tightened. The novel gasket also permits an uninterrupted flow of fluid through the pipe joint by assuring an unrestricted internal diameter at the joint. The seal lends itself to ease of utilization and in no way hinders the normal operation of making up the pipe joint. It also has been found that the seal will withstand the effects of vacuum and pressure to permit the re-use of the seal. The novel gasket assures an efficient seal at the pipe joint and is of a simple and economical construction.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

In combination with cement lined pipe sections having the adjacent ends thereof threadedly secured in the opposed ends of a tubular pipe coupling, an apertured circular non-corrosive resilient sealing member disposed and compressed between the adjacent pipe ends to seal the pipe joint between the two sections of pipe coupled together in tandem relation, said sealing member provided with a plurality of re-inforcing rings to preclude collapsing thereof under low pressure conditions within the pipe, said aperture of the sealing member being cylindrical throughout its length and of the same diameter as the inner diameter of said linking and internally stressed between said pipe ends from a normal uncompressed shape in which the surface of said aperture is concave whereby no internal obstruction obtains in the joint.

References Cited in the file of this patent

UNITED STATES PATENTS

| | | |
|---|---|---|
| Re. 19,047 | Hinderliter | Jan. 16, 1934 |
| 1,941,174 | Jensen | Dec. 26, 1933 |
| 2,070,291 | McHugh | Feb. 9, 1937 |
| 2,233,734 | Ely et al. | Mar. 4, 1941 |
| 2,274,477 | Howard et al. | Feb. 24, 1942 |
| 2,318,112 | Stillwagon | May 4, 1943 |
| 2,487,241 | Hilton | Nov. 8, 1949 |
| 2,684,861 | Loettler | July 27, 1954 |
| 2,714,853 | Schlamann | Aug. 9, 1955 |

FOREIGN PATENTS

| | | |
|---|---|---|
| 641,125 | Great Britain | Aug. 2, 1950 |
| 702,806 | Great Britain | Jan. 20, 1954 |